No. 631,657. Patented Aug. 22, 1899.
E. OLDENBUSCH.
PICTURE FRAME.
(Application filed May 8, 1899.)
(No Model.)
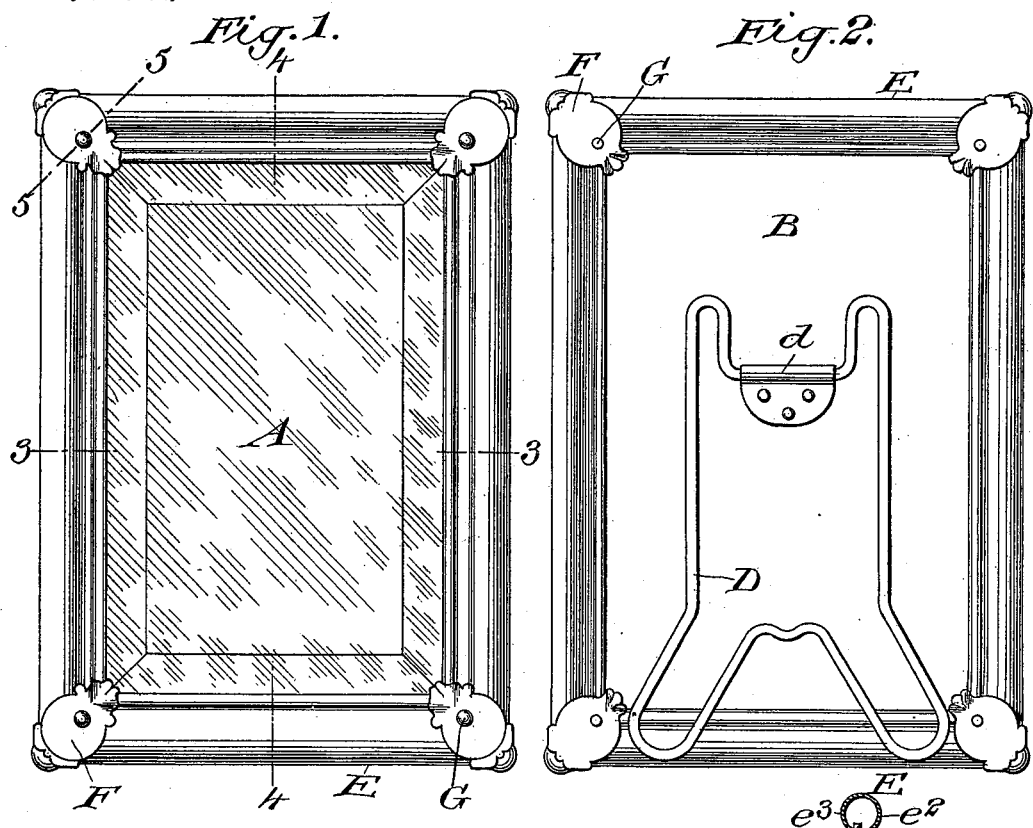
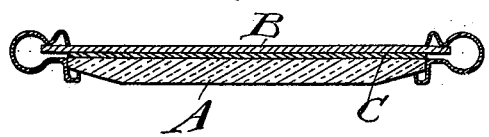
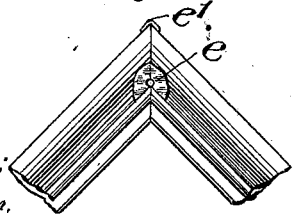
Witnesses:
George Barry Jr.
Edward Vieser.
Inventor:
Ernst Oldenbusch
by attorneys

UNITED STATES PATENT OFFICE.

ERNEST OLDENBUSCH, OF JERSEY CITY, NEW JERSEY, ASSIGNOR TO WILLIAM SCHIMPER & CO., OF HOBOKEN, NEW JERSEY.

PICTURE-FRAME.

SPECIFICATION forming part of Letters Patent No. 631,657, dated August 22, 1899.

Application filed May 8, 1899. Serial No. 716,049. (No model.)

*To all whom it may concern:*

Be it known that I, ERNEST OLDENBUSCH, a citizen of the United States, and a resident of Jersey City, in the county of Hudson and State of New Jersey, have invented a new and useful Improvement in Mirror-Frames, of which the following is a specification.

My invention relates to an improvement in mirror-frames, with the object in view of providing a frame which will have its sides formed of sheet metal permanently secured together and in which its front will be extended inwardly beyond the inner edge of its back to form a seat for the mirror, so that the mirror can be readily inserted into its seat through the back of the frame.

A further object is to provide a frame of the above character in which a flexible back plate is used for holding the mirror in position in its seat, the free edges of the flexible back plate being fitted to extend into the space between the front and back of the mirror, so that the said flexible plate can be secured in position, and thus secure the plate in position, by means of locking-pins which pass through the front and back of the frame and also through the flexible back plate.

A still further object is to provide corner-pieces for the frame which will serve the double function of protecting the corners of the frame and also of covering up the joints where the sides of the frame are permanently secured together, thereby producing a neat and attractive frame.

A practical embodiment of my invention is represented in the accompanying drawings, in which—

Figure 1 is a front view of my improved frame with a mirror in position therein. Fig. 2 is a back view of the frame, showing the flexible back plate in its position, the back plate being herein represented as being provided with a suitable supporting-bracket. Fig. 3 is a transverse sectional view taken in the plane of the line 3 3 of Fig. 1. Fig. 4 is a vertical sectional view taken in the plane of the line 4 4 of Fig. 1. Fig. 5 is a sectional view taken in the plane of the line 5 5 of Fig. 1, looking toward the corner of the frame; and Fig. 6 is a detail back view of one corner of the frame with the corner-piece removed.

The mirror represented herein is denoted by A, the flexible back plate by B, and the intermediate board, which is interposed between the back of the mirror and the flexible back plate, by C. The flexible back plate B is provided with a supporting-bracket D of any suitable form, which bracket is hinged at $d'$ to said flexible back plate, so that when the mirror is set up in position for use the said bracket will form a support therefor.

The mirror-frame E comprises four sides formed of sheet metal permanently secured together at the corners of the frame in any suitable manner—as, for instance, partially by solder $e$ and mechanical fastenings $e'$. The front $e^2$ and back $e^3$ of the frame are spaced apart, as shown, for receiving between them the overlapping edges of the flexible back plate B. The front $e^2$ of the frame is extended inwardly beyond the inner edge of the back $e^3$ to form a seat $e^4$ for the reception therein of the mirror A. By this arrangement the mirror can be inserted into its seat after the sides of the frame have been permanently secured together, the seat being so arranged that when the mirror is inserted into the said seat the mirror will be held against all sliding movement.

I provide corner-pieces F for overlapping the front and back of the frame, at the corners thereof, which corner-pieces serve the double function of protecting the corners of the frame and also of hiding from sight the joints formed by the meeting of the sides.

I provide a locking pin or rivet G for each corner of the frame, which pin passes through holes in the corner-piece F, the front and back of the frame at the corner, and also through a hole in the corner of the flexible back plate B.

The several parts are combined in the following manner: The mirror is inserted through the back of the frame into its position in its seat $e^4$. The intermediate board C may then be placed upon the back of the mirror to protect it from being scratched by the flexible back plate B, if so desired. The flexible back plate is then inserted into position by so bending its edges that they can be successively inserted into the space between the front and back of the side of the frame.

The corner-pieces F are then inserted into position around the corners of the frame. The locking pins or rivets are then inserted through the holes in the corner-pieces, the front and back of the frame, and the flexible back plate B. To hold the pins or rivets in their positions, their free ends, which project beyond the backs of the corner-pieces, may be upset slightly.

While I have described my improvement as a mirror-frame, it is obvious that the frame could be used for other articles than mirrors with good effect, and it is also evident that slight changes might be resorted to in the construction and arrangement of the several parts without departing from the spirit and scope of my invention. Hence I do not wish to limit myself strictly to the structure herein set forth; but

What I claim is—

1. The combination with a mirror and its flexible back plate, of a frame having its sides formed of sheet metal permanently secured together, its front being extended inwardly beyond the inner edge of its back to form a seat for the mirror and the front and back of the frame being spaced apart to receive between them the edges of the flexible back plate, the inner edge of the said back overlapping the edges of the flexible back plate entirely around the frame, for holding the mirror in position within the frame, substantially as set forth.

2. The combination with a mirror and its flexible back plate, of a frame having its sides formed of sheet metal permanently secured together, its front being extended inwardly beyond the inner edge of its back to form a seat for the mirror, the said front and back of the frame being spaced apart to receive between them the edges of the flexible back plate and fastening-pins extending through the front and back of the frame and through the flexible back plate for securing the back plate and thereby the mirror in position, substantially as set forth.

3. The combination with a mirror and its flexible back plate, of a frame having its sides formed of sheet metal permanently secured together at the corners of the frame, the front of the frame being extended inwardly to form a seat for the mirror, the front and back of the frame being spaced apart to receive between them the edges of the flexible back plate, corner-pieces fitted to embrace and protect the corners of the frame and a pin passing through each corner-piece and its adjacent front and back of the frame and the flexible back plate for securing the parts in position, substantially as set forth.

In testimony that I claim the foregoing as my invention I have signed my name, in presence of two witnesses, this 24th day of March, 1899.

ERNEST OLDENBUSCH.

Witnesses:
FREDK. HAYNES,
EDWARD VIESER.